United States Patent Office 3,560,477
Patented Feb. 2, 1971

3,560,477
PHENYL-AZO-NAPHTHOIC ACID ARYLIDE
PIGMENTS
Rudolf Mory, Dornach, and Willy Mueller, Riehen,
Switzerland, assignors to Ciba Limited, Basel, Switzerland, a company of Switzerland
No Drawing. Filed Feb. 28, 1967, Ser. No. 619,165
Claims priority, application Switzerland, Mar. 23, 1966,
4,191/66
Int. Cl. C07c *107/04;* C09b *29/20*
U.S. Cl. 260—203                                         9 Claims

ABSTRACT OF THE DISCLOSURE

The present invention concerns monoazo dyestuff pigments. They are characterized in that the diazo component is a 3-amino-4-carbalkoxy-benzoic acid anilide, the anilide radical of which is substituted in m- or p-position to the —NH— group by a carboxylic acid arylide radical, and in that the coupling component is a 2,3-hydroxy-naphthoic acid arylide. When incorporated in plastics or lacquers these pigments yield orange to red colorings having excellent fastness properties.

---

The present invention is based on the observation that valuable new monoazo pigments of the formula:

(1) 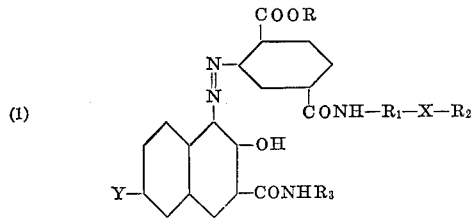

in which R represents an alkyl group, $R_1$ represents a phenylene group, $R_2$ and $R_3$ each represents an aryl residue, X represents a carboxylic acid amide group in meta-position or preferably in para-position to the —NH— group and Y represents a hydrogen or a halogen atom or an alkoxy or cyano group, may be obtained when (a) a carboxylic acid halide of the formula:

(2) 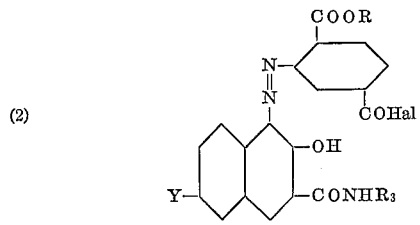

is condensed with an amine of the formula:

(3) $H_2N-R_1-X-R_2$ 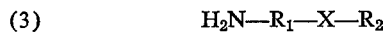

or (b) a diazo compound of an amine of the formula:

(4) 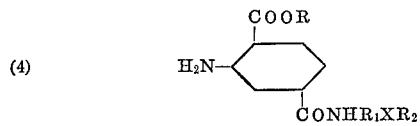

is coupled with a naphthol of the formula:

(5) 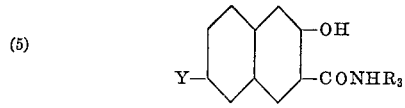

Since the products of the invention are pigments, they must not contain groups imparting solubility in water, particularly acid groups imparting solubility in water, for example, sulphonic acid or carboxylic acid groups.

The azo dyestuff carboxylic acids from which the acid halides are prepared may be obtained by coupling a diazo compound of an aminocarboxylic acid of the formula:

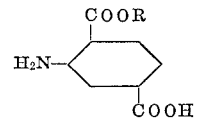

in which R has the meaning given above, for example, 3-amino-4-carbomethoxybenzoic acid or 3 - amino-4-carbethoxybenzoic acid, with a naphthol of the formula:

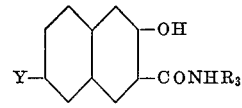

in which $R_3$ and Y have the meanings given above.

The following are examples of naphthols:

2,3-hydroxynaphthoic acid anilide,
2,3-hydroxynaphthoic acid-ortho-methoxyanilide,
2,3-hydroxynaphthoic acid-ortho-ethoxyanilide,
2,3-hydroxynaphthoic acid-ortho-methylanilide,
2,3-hydroxynaphthoic acid-para-chloroanilide,
2,3-hydroxynaphthoic acid-meta-nitroanilide,
2,3-hydroxynaphthoic acid-2'-methyl-4'-chloroanilide,
2,3-hydroxynaphthoic acid-2',4'-dimethoxy-5'-chloroanilide,
2,3-hydroxynaphthoic acid-2'-methoxy-4'-chloro-5'-methylanilide,
2,3-hydroxynaphthoic acid-2',5'-dimethoxyanilide,
2,3-hydroxynaphthoic acid-2',4'-dimethoxyanilide,
2,3-hydroxynaphthoic acid-meta-trifluoromethylanilide, and
2,3-hydroxynaphthoic acid-α-naphthylamide.

The azo dyestuff carboxylic acids obtained are treated with agents which are capable of converting carboxylic acids into their acid halides, for example, chlorides or bromides, such agents being, in particular, phosphorus halides, for example, phosphorus pentabromide, phosphorus trichloride, phosphorus pentachloride, phosphorus oxyhalides and preferably thionyl chloride.

The treatment with the said acid halogenating agents is advantageously carried out in an inert organic solvent, for example, in dimethylformamide, a chlorobenzene, for example, monochlorobenzene or dichlorobenzene, toluene, xylene or nitrobenzene. When using the last five solvents dimethylformamide may also be added.

When preparing the carboxylic acid halides it is generally advantageous first to dry the azo compounds which have been made in an aqueous medium, or to free them from water by azeotropic distillation in an organic solvent. If desired, the azeotropic drying operation may be carried out immediately prior to treatment with the acid halogenating agents.

The azo dyestuff carboxylic acid chlorides so obtained are preferably condensed with monamines of the formula:

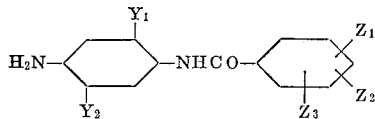

in which $Y_1$ and $Y_2$ each represents a hydrogen or halogen atom or an alkyl, trifluoromethyl or alkoxy group, $Z_1$ represents a hydrogen or a halogen atom and $Z_2$ and $Z_3$ each represents a hydrogen or halogen atom or an alkyl, alkoxy, nitro, cyano, carbalkoxy, aliphatic acylamino or trifluoromethyl group.

The following amines may be mentioned as examples:
4-benzoylaminoaniline,
2,5-dichloro-4-benzoylaminoaniline,
2,5-dichloro-4-(4'-chlorobenzoylamino)-aniline,
2,5-dichloro-4-(2',4'-dichlorobenzoylamino)-aniline,
2,5-dichloro-4-(2',5'-dichlorobenzoylamino)-aniline,
2,5-dichloro-4-(4'-methylbenozylamino)-aniline,
2,5-dichloro-4-(4'-phenylbenzoylamino)-aniline,
2,5-dimethyl-4-benzoylaminoaniline,
2,5-dimethyl-4-(4'-chlorobenzoylamino)-aniline,
2,5-dimethyl-4-(2',4'-dichlorobenzoylamino)-aniline,
2,5-dimethyl-4-(2',5'-dichlorobenzoylamino)-aniline,
2,5-dimethyl-4-(4'-methylbenzoylamino)-aniline,
2,5-dimethyl-4-(4'-phenylbenzoylamino)-aniline,
2,5-dimethyl-4-(4'-methoxybenzoylamino)-aniline,
2-chloro-5-methyl-4-benzoylamino-aniline,
2-chloro-5-methyl-4-(4'-chlorobenzoylamino)-aniline,
2-chloro-5-methyl-4-(2',5'-dichlorobenzoylamino)-aniline,
2-chloro-5-methyl-4-(4'-methylbenzoylamino)-aniline,
2-chloro-5-methyl-4-(4'-phenylbenzoylamino)-aniline,
2-methoxy-5-chloro-4-(benzoylamino)-aniline,
2-methoxy-5-chloro-4-(4'-chlorobenzoylamino)-aniline,
2-methoxy-5-chloro-4-(2',5'-dichlorobenzoylamino)-aniline,
2-methoxy-5-chloro-4-(4'-methylbenzoylamino)-aniline,
2-methoxy-5-chloro-4-(4'-phenylbenzoylamino)-aniline,
4-(4'-carbomethoxy)-benzoylaminoaniline,
2,5-dichloro-4-(4'-carbethoxy)-benzoylaminoaniline,
2,5-dimethyl-4-(4'-carbomethoxy)-benzoylaminoaniline,
4-(4'-chloro)-benzoylaminoaniline,
4-(4'-methyl)-benzoylaminoaniline,
4-(4'-methoxy)-benzoylaminoaniline,
4-(3'-acetylamino)-benzoylaminoaniline and
4-(4'-phenyl)-benzoylaminoaniline.

Instead of benzoylaminoanilines, it is also possible to condense aminobenzenecarboxylic acid anilides with carboxylic acid halides of the Formula 2, for example:

4-chloro-3-aminobenzoic acid-(2',5'-dichloro)-anilide,
4-methoxy-3-aminobenzoic acid-(2',5'-dichloro)-anilide,
4-chloro-3-aminobenzoic acid-(3'-trifluoromethyl)-anilide,
4-chloro-3-aminobenzoic acid-(2',5'-dimethyl-4'-chloro)-anilide,
5-amino-2,4-dichlorobenzoic acid-(3'-trifluoromethyl)-anilide,
4-chloro-3-aminobenzoic acid-(5'-trifluoromethyl-2'-chloro)-anilide,
4-methoxy-3-aminobenzoic acid-(5'-trifluoromethyl-2'-chloro)-anilide,
4-chloro-3-aminobenzoic acid-(5'-carbomethoxy-2'-chloro)-anilide,
4-methoxy-3-aminobenzoic acid-(5',8'-dichloro-α-naphthyl)-amide,
4-methoxy-3-aminobenzoic acid-(5'-carbomethoxy-2'-chloro)-anilide,
4-chloro-3-aminobenzoic acid-(2',5'-dimethyl-4'-chloro)-anilide,
4-chloro-3-aminobenzoic acid-(3',5'-ditrifluoromethyl)-anilide,
4-chloro-3-(4'-chloro-3'-amino)-benzoylaminobenzoic acid phenylester,
4-chloro-3-(4'-chloro-3'-amino)-benzoylaminobenzoic acid-4''-chlorophenylester,
5-(4'-chloro-3'-amino)-benzoylamino-2,4-dichlorobenzoic acid phenylester,
5-(4'-chloro-3'-amino)-benzoylamino-2,4-dichlorobenzoic acid benzylester,
5-(4'-chloro-3'-amino)-benzoylamino-2,4-dichlorobenzoic acid-4''-chlorophenylester,
5-(4'-chloro-3'-amino)-benzoylamino-2,4-dichlorobenzoic acid-4''-chlorobenzylester,
4-chloro-3-(4'-chloro-3'-amino)-benzoylaminobenzoic acid-4''-chlorobenzylester and
4-chloro-3-(4'-chloro-3'-amino)-benzoylaminobenzoic acid-4''-methoxybenzylester.

Condensation between the carboxylic acid halides of the kind defined above and the amines is advantageously carried out in an anhydrous medium. Under these conditions it generally proceeds surprisingly easily, even at temperatures within the boiling range of the common organic solvents, for example, toluene, monochlorobenzene, dichlorobenzene, trichlorobenzene, nitrobenzene and the like. To increase the rate of reaction, it is generally advantageous to use an agent capable of binding acid, for example, anhydrous sodium acetate or pyridine. Some of the products obtained are crystalline and some are amorphous. They are generally obtained in a very good yield and in a pure state. It is expedient first to isolate the acid chlorides obtained from the carboxylic acids. In some cases, however, isolation of the acid chlorides may be omitted without harm, and condensation may be effected immediately after the preparation of the carboxylic acid chlorides.

In method (b) of the process of the invention, the new colourants are obtained when a diazo compound of an amine of the Formula 4, especially one corresponding to the formula

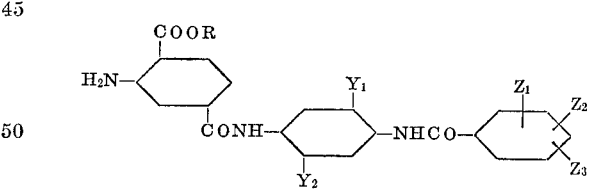

in which R, $Y_1$, $Y_2$, $Z_1$, $Z_2$ and $Z_3$ have the meanings given above, is coupled with a 2,3-hydroxynaphthoic acid arylide.

Coupling is effected by the gradual addition of an aqueous, alkaline solution of the coupling component to the acidic solution of the diazonium salt. The amount of alkali metal hydroxide used to dissolve the coupling component is advantageously measured in a manner such that there is sufficient present to neutralize the mineral acid liberated from the diazonium salt. Coupling is advantageously carried out at a pH value of 4 to 6. The pH is advantageously adjusted by the addition of a buffer. Suitable buffers are, for example, the salts, especially the alkali metal salts of formic acid, phophoric acid or especially acetic acid. The alkaline solution of the coupling component advantageously contains a wetting agent, a dispersing agent or an emulsifying agent, for example, an aralkylsulphonate, for example, dodecylbenzenesulphonate, or the sodium salt of 1,1'-naphthylmethane sulphonic acid, polycondensation products of alkylene oxides, for example, the product obtained by reacting ethylene oxide with para-tertiary-octylphenol, and also the alkyl esters of sulphoricinoleates, for example, n-butylsulphoricinoleate. The dispersion of the coupling component may also advantageously contain protective colloids, for example, methyl cellulose or small amounts of inert organic solvents which are sparingly soluble or insoluble in water, for example, aromatic hydrocarbons which may be halogenated or nitrated, for example, benzene, toluene, xylene, chlorobenzene, dichlorobenzenes or nitrobenzene, and also aliphatic halogenated hydrocarbons, for example, carbon tetrachloride or trichloroethylene. Organic solvents miscible with water may also be used for example, acetone, ethylene glycol monomethyl ether, methyl-ethyl ketone, methanol, ethanol or isopropanol.

It is also advantageous to carry out the coupling by continuously mixing an acidic solution of the diazonium salt with an alkaline solution of the coupling component in a mixing nozzle, in which process coupling takes place instantaneously. Care must be taken to ensure that diazo component and coupling component are present in the mixing nozzle in equimolecular amounts, but it is advantageous if the coupling component is present in a slight excess. The simplest way of doing this is by control of the pH value of the liquid in the mixing nozzle. Care must also be taken to ensure that the two solutions are in a state of violent turbulence in the mixing nozzle. The pigment dispersion formed is removed from the mixing nozzle continuously and the pigment is isolated by filtration.

The new products are valuable pigments which can be put to a very wide variety of uses. For example, they may be used in a state of fine division for the spin colouration of filament and staple-fibre viscose, cellulose ethers and esters, polyamides, polyurethanes and polyesters. They can also be used in the manufacture of coloured lacquers and lake-formers, solutions or products made from acetylcellulose, nitrocellulose, natural resins or synthetic resins, for example, polymerization resins or condensation resins, for example, aminoplasts, alkyd resins, phenoplasts, polyolefines, for example, polystyrene, polyvinyl chloride, polyethylene, polypropylene, polyacrylonitrile, rubber, casein, silicones and silicone resins. They may also be used with advantage in the manufacture of coloured pencils, cosmetic preparations and laminated sheet material.

The following examples illustrate the invention. Unless otherwise stated, the parts and percentages are by weight.

EXAMPLE 1

7.2 parts by volume of thionyl chloride and 0.6 part by volume of dimethylformamide are added to 26 parts of the dyestuff obtained by coupling diazotized 3-amino-4-carbomethoxybenzoic acid with 2,3-hydroxynaphthoic acid-α-naphthylamide, in 100 parts by volume of chlorobenzene. The mixture is heated under reflux for 1½ hours at 130 to 140° C. and then allowed to cool. The crystals, in the form of platelets, are isolated by filtration and dried in vacuo at 50 to 60° C. 25 parts of the acid chloride are obtained.

5.4 parts of this acid chloride together with 2.3 parts of 4-benzoylamino-1-aminobenzene are heated for 12 hours at 130–140° C. in 250 parts by volume of ortho-dichlorobenzene and 0.8 part by volume of pyridine. The batch is allowed to cool somewhat, 1 part by volume of ammonia solution of 24% strength is added, the pigment is isolated by filtration and washed successively with hot ortho-dichlorobenzene, cold dimethyl-formamide, hot ethanol and hot water. After drying in vacuo at 60 to 70° C., 6.4 parts of a red, soft-grained pigment are obtained. The pigment corresponds to the formula:

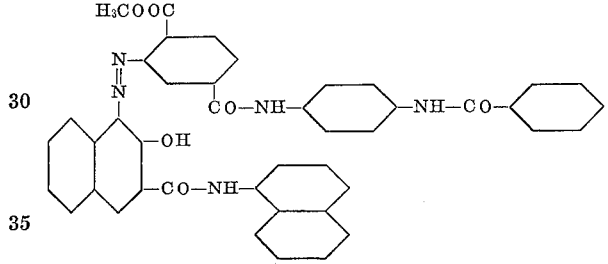

The following table lists components from which further pigments may be obtained by coupling diazotised 3-amino-4-carbomethoxybenzoic acid with the 2,3-hydroxynaphthoic acid arylide shown in Column I in the manner indicated in Example 1, the azo dyestuff carboxylic acid thus obtained is converted into the acid chloride with thionyl chloride, and the acid chloride is condensed with the amine shown in Column II. The tint obtained in polyvinyl chloride film is indicated in Column III.

| I | II | III |
|---|---|---|
| 2,3-hydroxynaphthoic acid-(2',4-dimethoxy-5'-chloroanilide). | 4-benzoylamino-1-aminobenzene | Scarlet. |
| 2,3-hydroxynaphthoic acid-α-naphthylamide | 4-(4'-chlorobenzoylamino)-1-aminobenzene | Brown-orange. |
| 2,3-hydroxynaphthoic acid,(2'-methoxy-anilide) | 4-benzoylamino-1-aminobenzene | Scarlet. |
| Do | 1-(3'-amino-4'-chlorobenzoylamino)-2-methylbenzene | Yellow-orange. |
| Do | 4-benzoylamino-2,5-dichloro-1-aminobenzene | Scarlet. |
| Do | 1-(4'-aminobenzoylamino)-3-trifluoromethylbenzene | Yellow-brown. |
| 2,3-hydroxynaphthoic acid-(2',4'-dimethoxy-5'-chloroanilide). | 4-(4'-chlorobenzoylamino)-1-aminobenzene | Brown-orange. |
| Do | 2,5-dichloro-4-benzoylamino-1-aminobenzene | Scarlet. |
| Do | 2,5-dimethyl-4-benzoylamino-1-aminobenzene | Red. |
| 2,3-hydroxynaphthoic acid anilide | 4-benzoylamino-1-aminobenzene | Scarlet. |
| Do | 4-(4'-chlorobenzoylamino)-1-aminobenzene | Orange. |
| 2,3-hydroxynaphthoic acid-(2'-methyl-4'-chloroanilide). | 2,5-dimethyl-4-benzoylamino-1-aminobenzene | Scarlet. |
| Do | 2,5-dichloro-4-benzoylamino-1-aminobenzene | Do. |
| Do | 4-(4'-methoxybenzoylamino)-1-aminobenzene | Orange. |
| Do | 4-(4'-methylbenzoylamino)-1-aminobenzene | Scarlet. |
| Do | 4-naphthoyl-(1')-amino-1-aminobenzene | Do. |
| Do | 4-(2'-chlorobenzoylamino)-1-aminobenzene | Do. |
| 2,3-hydroxynaphthoic acid-(2'-methyl-4'-chloroanilide). | 4-(2',5'-dichlorobenzoylamino)-1-aminobenzene | Do. |
| Do | 4-benzoylamino-1-aminobenzene | Do. |
| Do | 4-(4'-chlorobenzoylamino)-1-aminobenzene | Orange. |
| Do | 1-(3'-amino-4'-chlorobenzoylamino)-2,4-dichlorobenzene | Crimson. |
| Do | 1-(3'-amino-4'-chlorobenzoylamino)-2-methyl-4-chlorobenzene | Scarlet. |
| Do | 1-(3'-amino-4'-methoxybenzoylamino)-2-methyl-5-chlorobenzene | Red. |
| 2,3-hydroxynaphthoic acid-(4'-methoxyanilide) | 4-benzoylamino-1-aminobenzene | Do. |
| Do | 4-(4'-chlorobenzoylamino)-1-aminobenzene | Red-orange. |
| Do | 2,5-dichloro-4-benzoylamino-1-aminobenzene | Red. |
| Do | 2,5-dimethyl-4-benzoylamino-1-aminobenzene | Scarlet. |
| Do | 4-(4'-methoxybenzoylamino)-1-aminobenzene | Do. |
| Do | 4-(4'-methylbenzoylamino)-1-aminobenzene | Red. |
| Do | 1-(4'-aminobenzoylamino)-4-chlorobenzene | Do. |

| I | II | III |
|---|---|---|
| 2,3-hydroxynaphthoic acid-α-naphthalide | 4-(4'-phenylbenzoylamino)-1-aminobenzene | Do. |
| Do | 4-(4'-methoxybenzoylamino)-1-aminobenzene | Red-orange. |
| Do | 4-(4'-methylbenzoylamino)-1-aminobenzene | Blue-red. |
| Do | 4-naphthoyl(1')-amino-1-aminobenzene | Brown-orange. |
| Do | 4-(2'-chlorobenzoylamino)-1-aminobenzene | Scarlet. |
| 2,3-hydroxynaphthoic acid-α-naphthalide | 4-(2',5'-dichlorobenzoylamino)-1-aminobenzene | Do. |
| Do | 1-(4'-aminobenzoylamino)-4-chlorobenzene | Red. |
| Do | 2,5-dichloro-4-benzoylamino-1-aminobenzene | Do. |
| Do | 2,5-dimethyl-4-benzoylamino-1-aminobenzene | Do. |
| 2,3-hydroxynaphthoic acid-(2',4'-dimethoxy-5'-chloroanilide). | 4-(4'-phenylbenzoylamino)-1-aminobenzene | Scarlet. |
| 2,3-hydroxynaphthoic acid-(2',4'-dimethoxy-5'-chloroanilide). | 4-(4'-methylbenzoylamino)-1-aminobenzene | Do. |
| Do | 4-naphthoyl(1')amino-1-aminobenzene | Orange. |
| Do | 4-(2'-chlorobenzoylamino)-1-aminobenzene | Do. |
| Do | 4-(2',5'-dichlorobenzoylamino)-1-aminobenzene | Red-orange. |
| Do | 1-(4'-aminobenzoylamino)-4-chlorobenzene | Scarlet. |
| Do | 1-(4'-aminobenzoylamino)-2-methyl-5-chlorobenzene | Yellow-brown. |
| Do | 1-(4'-aminobenzoylamino)-2,4-dichlorobenzene | Scarlet. |
| 2,3-hydroxynaphthoic acid-(4'-methoxyanilide) | 4-(4'-phenylbenzoylamino)-1-aminobenzene | Red-orange. |
| Do | 4-(2'-chlorobenzoylamino)-1-aminobenzene | Scarlet. |
| Do | 4-(2',5'-dichlorobenzoylamino)-1-aminobenzene | Do. |
| Do | 1-(4'-aminobenzoylamino)-2-methyl-5-chlorobenzene | Do. |
| 2,3-hydroxynaphthoic acid-(2'-methyl-4'-chloroanilide). | 3-chloro-4-benzoylamino-1-aminobenzene | Do. |
| 2,3-hydroxynaphthoic acid-β-naphthalide | 4-benzoylamino-1-aminobenzene | Red. |
| 2,3-hydroxynaphthoic acid-β-naphthalide | 4-(4'-chlorobenzoylamino)-1-aminobenzene | Red-orange |
| Do | 2,5-dichloro-4-benzoyl-amino-1-aminobenzene | Red. |
| Do | 4-(4'-phenylbenzoylamino)-1-aminobenzene | Scarlet. |
| Do | 4-(4'-methoxybenzoyl-amino)-1-aminobenzene | Do. |
| Do | 4-(5'-methylbenzoyl-amino)-1-aminobenzene | Red. |
| Do | 2,5-dimethyl-4-benzoyl-amino-1-aminobenzene | Scarlet. |
| 2,3-hydroxynaphthoic acid-anilide | 4-(4'-phenylbenzoylamino)-1-aminobenzene | Do. |
| Do | 4-(4'-methylbenzoylamino)-1-aminobenzene | Red. |
| Do | 4-(4'-methoxybenzoyl-amino)-1-amino)-1-amino-benzene | Orange. |
| Do | 2,5-dichloro-4-benzoyl-amino-1-aminobenzene | Scarlet. |
| 2,3-hydroxynaphthoic acid-4'-methylanilide | do | Do. |
| Do | 2,5-dimethyl-4-benzoylamino-1-aminobenzene | Do. |
| Do | 3-chloro-4-(2'-methylbenzoylamino)-1-aminobenzene | Do. |
| Do | 3-chloro-4-(2',4'-dichlorobenzoylamino)-1-aminobenzene | Do. |
| Do | 3,5-dichloro-4-(4'-methoxybenzoylamino)-1-aminobenzene | Red. |
| Do | 1-(3'-amino-4'-methoxybenzoylamino)-3-trifluoromethybenzene | Brown-orange |
| Do | 4-(4'-phenylbenzoylamino)-1-aminobenzene | Orange. |
| Do | 4-(4'-methylbenzoylamino)-1-aminobenzene | Red. |
| 2,3-hydroxynaphthoic acid-(4'-methylanilide) | 4-(2',5'-dichlorobenzoyl-amino)-1-aminobenzene | Scarlet. |
| Do | 1-(4'-aminobenzoylamino)-4-chlorobenzene | Do. |
| Do | 3,5-dichloro-4-benzoyl-amino-1-aminobenzene | Red. |
| Do | 4-(2'-chlorobenzoyl-amino)-1-aminobenzene | Scarlet. |
| Do | 4-benzoylamino-1-aminobenzene | Do. |
| 2,3-hydroxynaphthoic acid-(2',5'-dimethoxy-4'-chloroanilide). | do | Do. |
| Do | 4-(4'-chlorobenzoylamino)-1-aminobenzene | Do. |
| Do | 4-naphthoyl(1')amino-1-aminobenzene | Brown-orange |
| Do | 4-aminobenzoic acid anilide | Do. |
| 2,3-hydroxynaphthoic acid-(2'-methoxy-5'-chloroanilide). | do | Scarlet. |
| Do | 4-benzoylamino-1-aminobenzene | Do. |
| Do | 4-(4'-methylbenzoylamino)-1-aminobenzene | Orange. |
| Do | 4-(4'-phenylbenzoylamino)-1-aminobenzene | Scarlet. |
| Do | 4-(4'-chlorobenzoylamino)-1-aminobenzene | Orange. |
| 2,3-hydroxynaphthoic acid-(2'-ethoxyanilide) | 4-(4'-chlorobenzoylamino)-1-aminobenzene | Do. |
| Do | 4-benzoylamino-1-aminobenzene | Do. |
| Do | 3-chloro-4-(4'-chlorobenzoylamino)-1-aminobenzene | Scarlet. |
| Do | 4-naphthoyl(1')amino-1-aminobenzene | Orange. |
| 2,3-hydroxynaphthoic acid-(2'-methyl-4'-chloroanilide). | 3-chloro-4-(3'-chlorobenzoylamino)-1-aminobenzene | Scarlet. |
| Do | 3-chloro-4-(4'-methylbenzoylamino)-1-aminobenzene | Do. |
| Do | 3,5-dichloro-4-(4'-chlorobenzoylamino)-1-aminobenzene | Do. |
| Do | 3,5-dichloro-4-benzoyl-amino-1-aminobenzene | Do. |
| 2,3-hydroxynaphthoic acid-β-naphthylamide | do | Blue-red. |
| Do | 2,3-dichloro-4-(4'-chlorobenzoylamino)-1-aminobenzene | Do. |
| Do | 4-naphthoyl(1')amino-1-aminobenzene | Scarlet. |
| Do | 3-chloro-4-(4'-methoxybenzoylamino)-1-aminobenzene | Blue-red. |
| Do | 3-chloro-4-(4'-chlorobenzoylamino)-1-aminobenzene | Do. |
| Do | 3-chloro-4-benzoylamino-1-aminobenzene | Do. |
| Do | 2-methoxy-4-benzoylamino-5-methyl-1-aminobenzene | Red. |
| 2,3-hydroxynaphthoic acid-(4'-chloroanilide) | 1-(3'-amino-4'-methoxy-benzoylamino)-2-methyl-5-chlorobenzene | Scarlet. |
| Do | 3,5-dichloro-4-(4'-chloro-benzoylamino)-1-aminobenzene | Do. |
| Do | 3-chloro-4-benzoylamino-1-aminobenzene | Do. |
| Do | 4-(4'-methoxybenzoylamino)-1-aminobenzene | Orange. |
| Do | 4-(4'-phenylbenzoylamino)-1-aminobenzene | Do. |
| Do | 2,5-dichloro-4-benzoyl-amino-1-aminobenzene | Scarlet. |
| 2,3-hydroxynaphthoic acid-(4'-chloroanilide) | 4-(4'-chlorobenzoylamino)-1-aminobenzene | Do. |
| Do | 4-benzoylamino-1-aminobenzene | Do. |
| 6-methoxy-2,3-hydroxynaphthoic acid-(2',5'-dimethoxy-4'-chloroanilide). | do | Blue-red. |
| Do | 4-(4'-chlorobenzoylamino)-1-aminobenzene | Do. |
| Do | 4-(4'-phenylbenzoylamino)-1-aminobenzene | Do. |
| Do | 1-(3'-amino-4'-methylbenzoylamino)-2-chloro-5-trifluoromethylbenzene. | Red-violet. |

The following table lists components for pigments which are obtainable by the procedure indicated in Example 1, but by using 3-amino-4-carbethoxybenzoic acid instead of 3-amino-4-carbomethoxybenzoic acid.

The arrangement of the columns is the same as in the preceding table.

| I | II | III |
|---|---|---|
| 2,3-hydroxynaphthoic acid-(2'-methoxyanilide) | 3-chloro-4-benzoylamino-1-aminobenzene | Orange. |
| Do | 4-(4'-methylbenzoylamino)-1-aminobenzene | Red-orange. |
| Do | 2,5-dichloro-4-benzoylamino-1-aminobenzene | Do. |
| Do | 2,5-dimethyl-4-benzoylamino-1-aminobenzene | Scarlet. |
| Do | 4-(2',5'-dichlorobenzoylamino)-1-aminobenzene | Do. |
| Do | 4-(4'-phenylbenzoylamino)-1-aminobenzene | Do. |
| 2,3-hydrox_naphthoic acid-(2'-methoxyanilide) | 4-(4'-methoxybenzoylamino)-1-aminobenzene | Red-orange. |
| Do | 4-(4'-chlorobenzoylamino)-1-aminobenzene | Do. |
| Do | 4-benzoylamino-1-aminobenzene | Orange. |
| 2,3-hydroxynaphthoic acid-(2'-methylanilide) | do | Do. |
| Do | 4-(4'-chlorobenzoylamino)-1-aminobenzene | Red-orange. |
| Do | 1-(3'-amino-4'-chlorobenzoylamino)-2,4-dichlorobenzene | Do. |
| Do | 4-aminobenzoic acid anilide | Scarlet. |
| Do | 4-(4'-methylbenzoylamino)-1-aminobenzene | Red-orange. |
| Do | 4-(4'-methoxybenzoylamino)-1-aminobenzene | Do. |
| Do | 4-(4'-phenylbenzoylamino)-1-aminobenzene | Scarlet. |
| Do | 2,5-dimethyl-4-benzoylamino-1-aminobenzene | Do. |
| Do | 2,5-dichloro-4-benzoylamino-1-aminobenzene | Red-orange. |
| 2,3-hydroxynaphthoic acid-α-naphthylamide | 4-benzoylamino-1-aminobenzene | Scarlet. |
| Do | 4-(4'-chlorobenzoylamino)-1-aminobenzene | Brown-orange. |
| Do | 4-(4'-phenylbenzoylamino)-1-aminobenzene | Red. |
| Do | 4-(4'-methylbenzoylamino)-1-aminobenzene | Red-orange. |

The following table lists components for pigments which are obtainable by the procedure indicated in Example 1 but by using 3-amino-4-carbo-n-propoxybenzoic acid instead of 3-amino-4-carbomethoxybenzoic acid. The arrangement of the columns is the same as in the first table.

| I | II | III |
|---|---|---|
| 6-bromo-2,3-hydroxynaphthoic acid-(2'-methoxyanilide) | 4-benzoylamino-1-aminobenzene | Scarlet. |
| Do | 4-(4'-chlorobenzoylamino)-1-aminobenzene | Do. |
| Do | 4-(4'-phenylbenzoylamino)-1-aminobenzene | Do. |
| Do | 4-naphthoyl(1')amino-1-aminobenzene | Do. |
| Do | 4-(4'-methylbenzoylamino)-1-aminobenzene | Do. |

EXAMPLE 2

7.8 parts of 4-(3'-amino-4'-carbomethoxybenzoylamino)-1-benzoylaminobenzene are dissolved in 140 parts by volume of dimethylformamide; 15 ml. of 3.5 N hydrochloric acid are added, the batch is cooled to 0°, and diazotization is effected during about 10 minutes with 10 ml. of 2 N sodium nitrite solution, 4.5 parts of sodium acetate crystals are then added.

A solution of 6.7 parts of 1-(2',3'-hydroxynaphtholyamino)-2-methoxy-5-chlorobenzene in 100 parts by volume of dimethylformamide is allowed to run into the mixture during about 15 minutes. The coupling mixture is stirred for 3 hours at room temperature, suction-filtered, the solid product is washed successively with dimethylformamide, chlorobenzene, methanol and hot water and then dried in vacuo at 60 to 70° C. 7.35 parts of pigment are obtained. When processed into a state of fine division, this pigment colours polyvinyl chloride film a scarlet tint possessing a very good fastness to migration and light.

EXAMPLE 3

A mixture is prepared from 65 parts of polyvinyl chloride, 35 parts of dioctyl phthalate and 0.2 part of the pigment obtained in the manner described in Example 1. This mixture is worked to and fro for 7 minutes on a two-roller mill at 140° C. A red film possessing a very good fastness to light and migration is obtained.

What is claimed is:

1. A monoazo pigment of the formula:

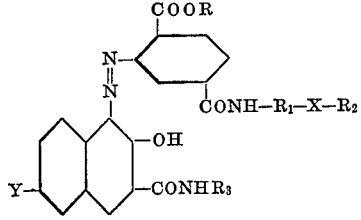

in which R represents a lower alkyl group, $R_1$ represents a phenylene group, $R_2$ and $R_3$ each represents phenyl or naphthyl or substituted phenyl or naphthyl wherein the substituents are selected from the group consisting of chloro, lower alkyl, trifluoromethyl, lower alkoxy, phenyl, nitro, cyano and lower carbalkoxy, X represents —NHCO— or —CONH— group in meta- or para- position to the —NH— group and Y represents a hydrogen or a bromine atom or a lower alkoxy group.

2. A monoazo pigment of the formula:

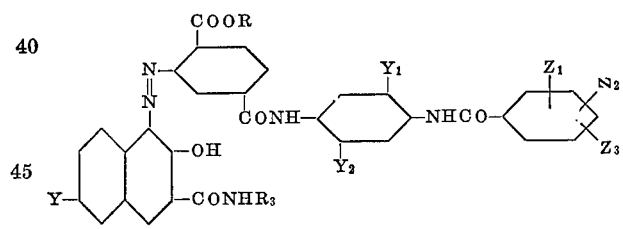

in which R represents a lower alkyl group, $R_3$ represents phenyl or naphthyl or substituted phenyl or naphthyl wherein the substituents are selected from the group consisting of chloro, lower alkyl, trifluoromethyl, lower alkoxy, phenyl, nitro, cyano and lower carbalkoxy and Y represents a hydrogen or a bromine atom or a lower alkoxy group, $Y_1$ and $Y_2$ each represents a hydrogen or chlorine atom or a lower alkyl, trifluoromethyl or lower alkoxy group, $Z_1$ represents hydrogen or chlorine and $Z_2$ and $Z_3$ each represents hydrogen, chlorine, nitro, cyano, lower carbalkoxy, lower alkyl, lower alkoxy, or trifluoromethyl.

3. The dyestuff as claimed in claim 1 of the formula:

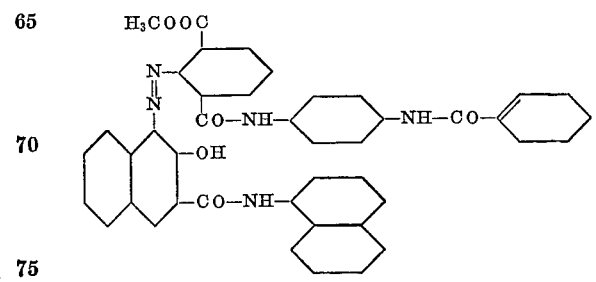

4. The dyestuff as claimed in claim 1 of the formula:

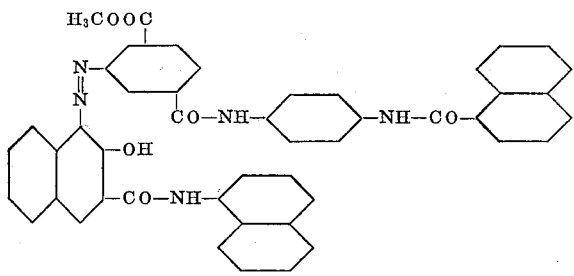

5: The dyestuff as claimed in claim 1 of the formula:

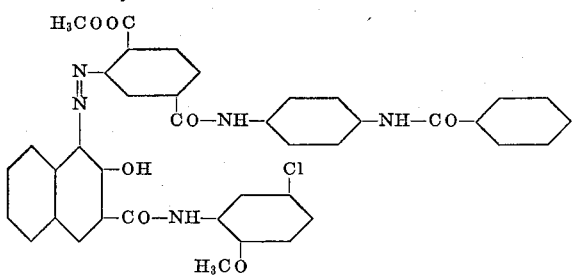

6. The dyestuff as claimed in claim 1 of the formula:

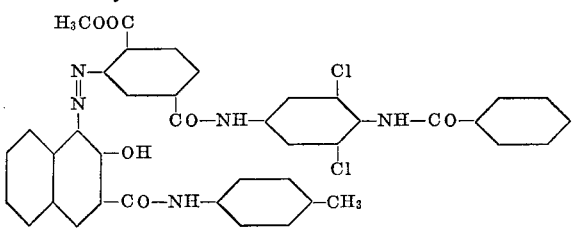

7. The dyestuff as claimed in claim 1 of the formula:

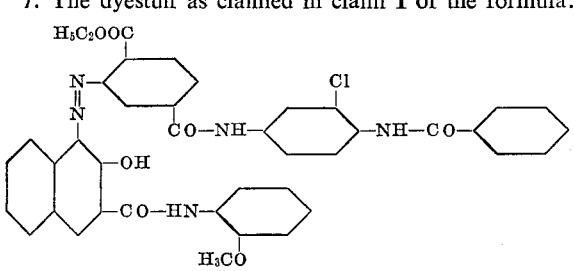

8. The dyestuff as claimed in claim 1 of the formula:

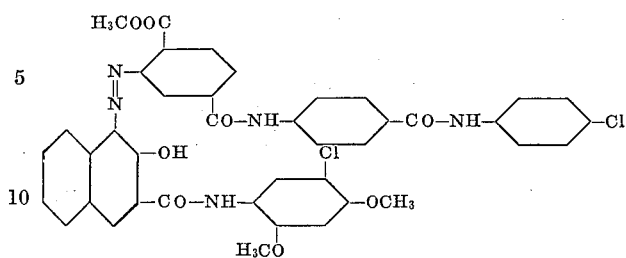

9. The dyestuff as claimed in claim 1 of the formula:

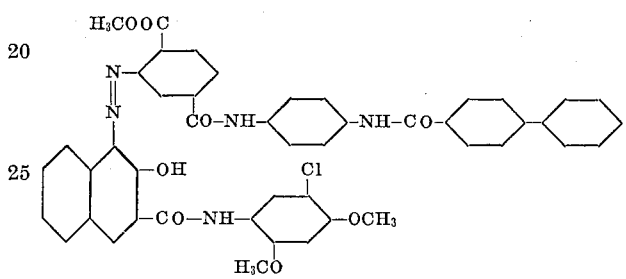

References Cited
UNITED STATES PATENTS

| | | | |
|---|---|---|---|
| 2,006,211 | 6/1935 | Fischer | 260—203X |
| 3,124,568 | 3/1964 | Mory, et al. | 260—203 |
| 3,200,109 | 8/1965 | Ribka | 260—203 |
| 3,321,458 | 5/1967 | Löhe, et al. | 260—203 |
| 3,366,623 | 1/1968 | Ronco | 260—203 |

FOREIGN PATENTS

| | | | |
|---|---|---|---|
| 679,275 | 8/1952 | Great Britain | 260—203 |

CHARLES B. PARKER, Primary Examiner

C. F. WARREN, Assistant Examiner

U.S. Cl. X.R.

8—4, 5, 8, 41, 50

CASE 5902/E

PO-1050
(5/69)

UNITED STATES PATENT OFFICE
CERTIFICATE OF CORRECTION

Patent No. 3,560,477          Dated February 2, 1971

Inventor(s) RUDOLF MORY ET AL

It is certified that error appears in the above-identified patent and that said Letters Patent are hereby corrected as shown below:

Column 10, claim 2, the right hand side of the formula should be:

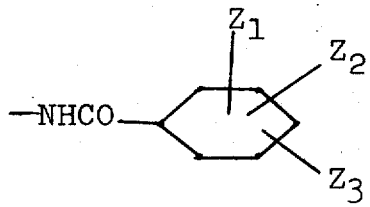

Column 10, claim 3, the right hand side of the formula should be:

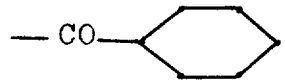

Column 11, claim 7, the lower portion of the formula should be:

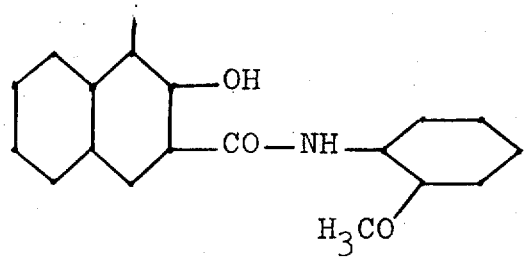

Signed and sealed this 7th day of March 1972.

(SEAL)
Attest: